Dec. 22, 1953 O. P. ERHARDT 2,663,369

TAPE DISPENSING MECHANISM WITH BLADE GUARD

Filed July 12, 1949 6 Sheets-Sheet 1

Inventor

Oscar P. Erhardt

By Rockwell & Bartholow

ATTORNEYS

Dec. 22, 1953 O. P. ERHARDT 2,663,369

TAPE DISPENSING MECHANISM WITH BLADE GUARD

Filed July 12, 1949 6 Sheets-Sheet 2

Inventor

Oscar P. Erhardt

By Rockwell & Bartholow

ATTORNEYS

TAPE DISPENSING MECHANISM WITH BLADE GUARD

Filed July 12, 1949

Inventor

Oscar P. Erhardt

By Rockwell-Bartholow

ATTORNEYS

Dec. 22, 1953 O. P. ERHARDT 2,663,369

TAPE DISPENSING MECHANISM WITH BLADE GUARD

Filed July 12, 1949 6 Sheets-Sheet 4

Inventor

Oscar P. Erhardt

By Rockwell & Bartholow

ATTORNEYS

Dec. 22, 1953 O. P. ERHARDT 2,663,369

TAPE DISPENSING MECHANISM WITH BLADE GUARD

Filed July 12, 1949 6 Sheets-Sheet 5

Inventor

Oscar P. Erhardt

By Rockwell & Bartholow

ATTORNEYS

Dec. 22, 1953 O. P. ERHARDT 2,663,369

TAPE DISPENSING MECHANISM WITH BLADE GUARD

Filed July 12, 1949 6 Sheets-Sheet 6

Inventor

Oscar P. Erhardt

By Rockwell & Bartholow

ATTORNEYS

UNITED STATES PATENT OFFICE 2,663,369

TAPE DISPENSING MECHANISM WITH BLADE GUARD

Oscar P. Erhardt, Derby, Conn., assignor to Derby Sealers, Incorporated, Derby, Conn., a corporation of Connecticut Application July 12, 1949, Serial No. 104,219

12 Claims. (Cl. 164—36)

This invention relates to a tape-dispensing mechanism, and more particularly to a mechanism for dispensing pressure-sensitive tape which is tacky or clingable upon one surface.

As illustrated, the device comprises what may be termed a "pull" machine, in that the tape is grasped between the thumb and forefinger of the operator and drawn from the roll. In some devices of this character, tape dispensers are so constructed that a free end of the tape will be presented in a projecting position, so that this free end may be grasped by the user of the device. In some instances, however, it is undesirable for the fingers of the operator to contact the extreme end of the tape on the tacky side thereof, and for this reason the present machine is so designed that the tape is grasped at some distance rearwardly of the free end.

Some means must be provided to sever the tape, which in the present instance comprises a stationary severing blade against which the tape is drawn after being pulled from the supply roll, and, in order that the severing operation may be easily performed, the severing blade is provided with a sharp edge. In order to prevent the fingers of the operator from being injured by coming into contact with the sharp edge of the severing blade, a guard is movably mounted adjacent the blade so that this guard will normally stand over the sharp edge of the blade and shield the same from contact. In some of the embodiments of the invention the guard member is pivoted, or movably attached, to the frame or blade support and is connected to an actuating member in such a manner that movement of the actuating member will effect a retiring or receding movement of the guard to expose the blade for contact with the tape. This actuating member serves a double purpose in that it acts as a stripper to strip the tape from the severing blade after a severing operation, and restores the guard to its operative position in which it shields the edge of the blade, and also holds the free end of the tape in a proper extended position so that it may be grasped by the user in order to draw a length of tape from the supply roll in a subsequent operation.

To effect the latter function, the actuating member is provided with a tape-end supporting surface adapted to engage the tacky side of the tape, and, in grasping the tape for a subsequent operation, the fingers of the operator engage the tape rearwardly of this supporting surface or between it and the supply roll so that his fingers do not come into contact with the forward edge of the tape.

As a result of this arrangement, the operator may readily grasp the tape rearwardly of its extreme end and draw it from the roll. Upon movement of the tape toward the severing blade, the stripper member will be engaged and moved in a direction to move the guard member from its shielding position over the edge of the blade, so that the tape may contact the latter and be severed. As the edge of the severing member is normally covered except when the tape is moved toward it for a severing operation, a sharp blade may be employed without danger to the operator.

One object of the present invention is to provide a new and improved mechanism for dispensing pressure-sensitive tape.

A further object of the invention is to provide a mechanism for dispensing pressure-sensitive tape such that the free end of the tape attached to the roll will be held in an extended position whereby the end may be grasped by the operator at a point rearwardly of the extreme end.

Still another object of the invention is to provide a tape-dispensing machine having a severing blade and a guard movably mounted on the frame adjacent the blade and so arranged that while it normally covers the blade edge, it will be moved to an inoperative position to expose the blade for contact of the tape therewith, and also to provide a stripper member connected to the guard member to effect movement thereof, the stripper member serving to strip the tape from the blade and restore the guard to its operative position after a severing operation.

Still another object of the invention is to provide a device of the character described above in which the stripper member is provided with a tape-end supporting surface engaging the tacky side of the tape to hold the free end of the tape in an extended position.

To these and other ends the invention consists in the novel features and combinations of parts to be hereinafter described and claimed.

Figure 1:
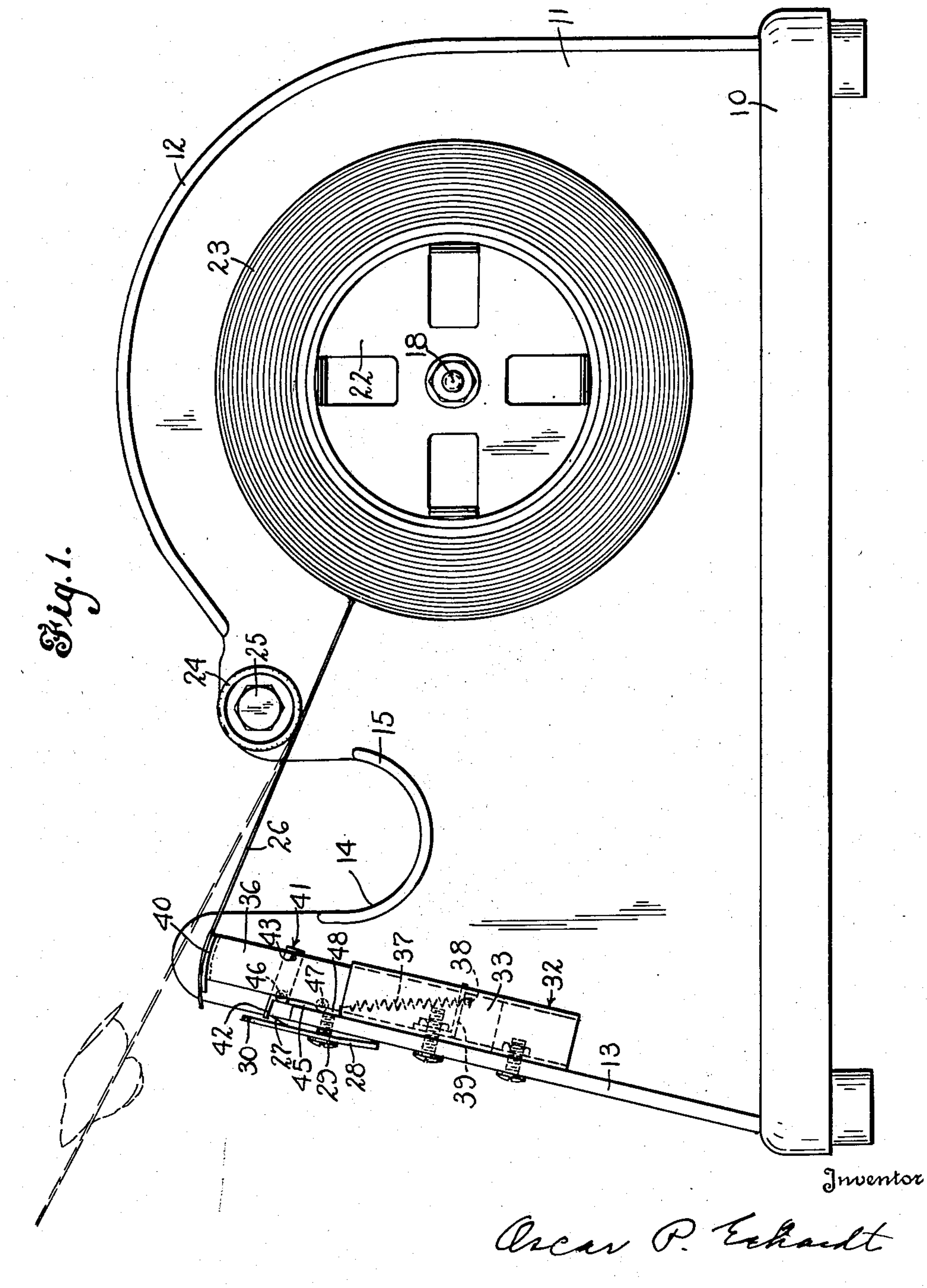
Fig. 1 is a side elevational view of a tape-dispensing mechanism embodying my invention, the cover of the housing being removed to show the interior mechanism.

To illustrate one embodiment of my invention, I have shown in Figs. 1 to 5 of the drawings a tape-dispensing mechanism comprising a frame consisting of a base 10 and a casing or housing supported upon the base. This housing comprises an upstanding side plate 11 having a laterally extending peripheral flange 12 at the rear and upper portion thereof, and a front flange 13. The latter also extends laterally from the plate 11 and, as shown more especially in Fig. 1, is inclined rearwardly from the base 10 in the direction of the supply roll of tape, which will be later described. The flange 12 is discontinued at the forward part of the machine so as to provide an opening through which the tape may emerge, and adjacent the forward portion of the plate 11 the latter is provided with a recess 14. An arcuate flange 15 extends laterally into the case from the lower edge of this recess.

The case may be completed by a cover member 16 (Fig. 2) which is of substantially the same shape as the plate 12 and designed to be secured at the edges of the flanges 12 and 13 opposite those to which the plate 11 is secured. This cover plate 16 may be secured in place by a nut 17 which is threaded upon a threaded spindle 18 secured in a boss 19 upon the plate 11 and which extends through an opening 20 in the cover.

Upon the spindle 18 is rotatably mounted a holder or reel 22 upon which is mounted a supply roll of tape 23. Forwardly of the tape, as shown in Fig. 1, a guide roller 24 is rotatably mounted upon a shaft 25 secured to the plate 11, this guide roller being engaged by the non-tacky side of the tape as it extends forwardly from the supply roll 23, as shown at 26.

Secured to the flange 13 adjacent the upper edge thereof is the severing blade 27 against which the tape may be drawn to be severed, this blade being held in place by a plate 28 secured to the flange 13 by screws 29. The plate 28 may be provided adjacent each side edge with an upstanding guard finger 30 to guard the edges of the blade 27, it being understood that the tape is drawn downwardly between these fingers when severed against the blade.

Secured to the inner face of the flange 13 is a guide bracket 32, this bracket being provided with a guide channel 33 at each side edge, these channels being spaced apart and facing each other in opposed relation. Slidably carried by the guide member 32 is a stripper member of substantially U-shaped form, this member comprising an upper web 34 and depending legs 35 and 36, one of the legs being mounted in each of the guide channels 33 so that the stripper member will be free to slide in an inclined direction parallel to the flange 13.

Figure 4:
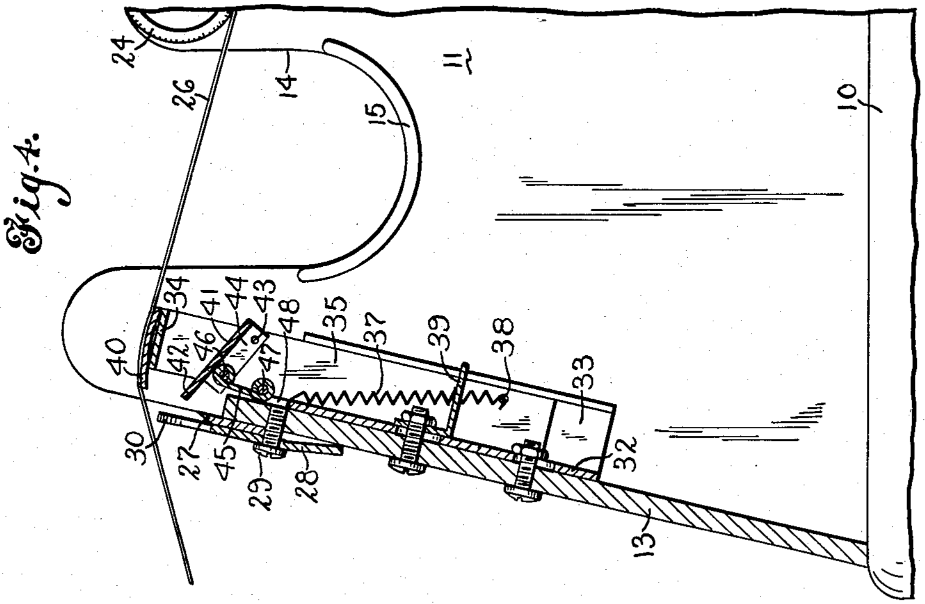
Fig. 4 is a vertical sectional view through the severing blade and associated mechanism.
Figure 3:
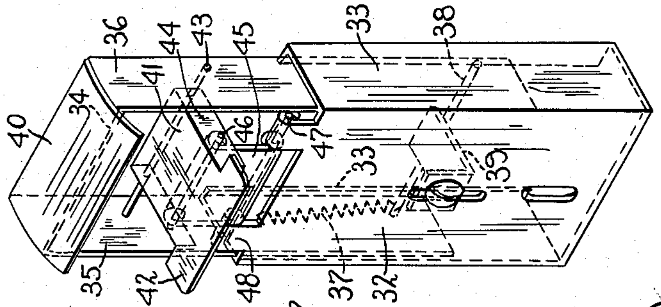
Fig. 3 is a perspective view of the stripper and guard mechanism detached from the frame.
Figure 2:
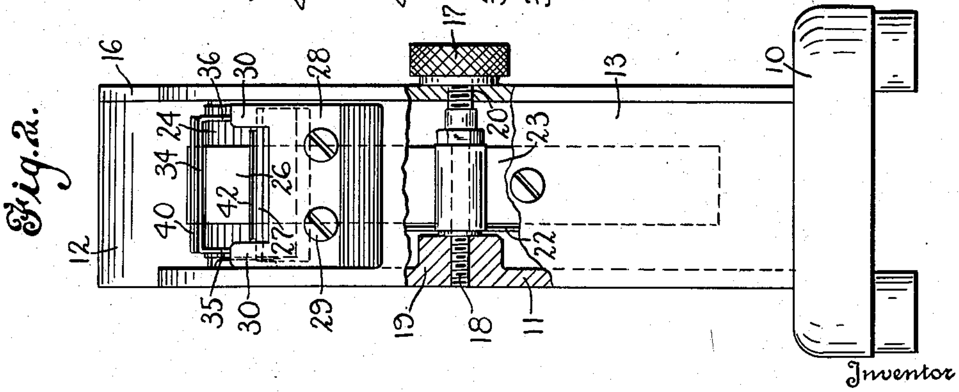
Fig. 2 is a front elevational view thereof, some parts being broken away.

A spring 37 is secured at its upper end to the guide member 32 and at its lower end to a bar 38 connecting the legs 35 and 36 so that the stripper member will be urged in an upward direction. A stop 39 is secured to the flange 13 and adapted to engage the bar 38 to limit the upward movement of the stripper member. A tape-end supporting member 40 is secured upon the web member 34 of the stripper, and this supporting member, as shown in Figs. 1 and 4, is adapted to engage the tacky side of the tape which will cling thereto. Thus the free end of the tape extending from the roll is normally held in extended position, as shown in Fig. 1, so that the operator may insert his forefinger in the recess 14 below the tape and grasp the latter to draw it from the supply roll.

As previously stated, it is desirable to provide a guard for the sharp edge of the severing blade to prevent engagement of the fingers of the user therewith, and it is necessary that this guard be moved to an inoperative position at the time of the severing operation in order that the tape may engage the blade. To this end a guard member of T-shaped form is provided as shown more especially in Fig. 3, this guard comprising the member 41 having a relatively broad forward end 42 designed to normally stand above the edge of the blade as shown in Fig. 1. The guard member is provided with depending flanges 44 which are pivotally mounted upon a pin 43 secured to the legs 35 and 36 of the stripper member.

The guard is also connected to the frame by means of a plate link 45, this link being pivoted at its upper end to a pin 46 secured to the guard member, and pivoted at its lower end upon a pin 47 carried in upstanding ears 48 provided upon the guide member 32. Thus, it will be seen that the guard member is pivoted directly to the legs 35 and 36 of the stripper and is pivotally attached to the frame by means of the intermediate link 45 which is pivoted at one end to the guard member and at the other end to the guide 32. It will be seen that during the initial movement of the stripper member downwardly, carrying with it the pivot pin 43, the guard member 41, which normally stands in the position shown in Fig. 1 with its forward portion over the severing blade, will be tilted about the pivot 46 so that it will be moved to the position shown in Fig. 4, so that its forward end will be drawn rearwardly or away from the severing blade. Upon continued movement of the stripper member downwardly, the link 45 will be moved about the pivot 47, thus moving the guard to the position shown in Fig. 5 in which the guard is in a substantially vertical position, and the stripper member has been moved to a position to permit the tape to engage the severing blade.

Figure 5:
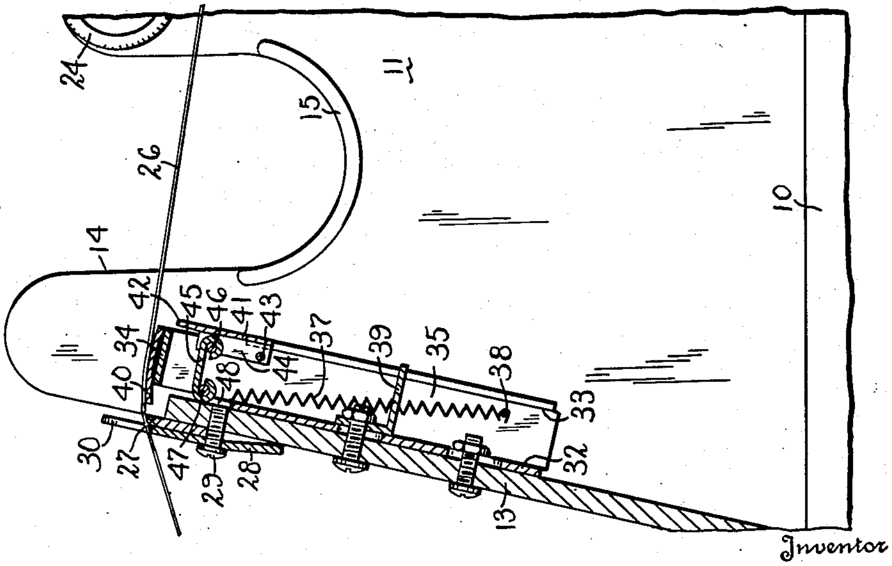
Fig. 5 is a view similar to Fig. 4 showing the parts in the position occupied when the tape is being severed.
Figure 10:
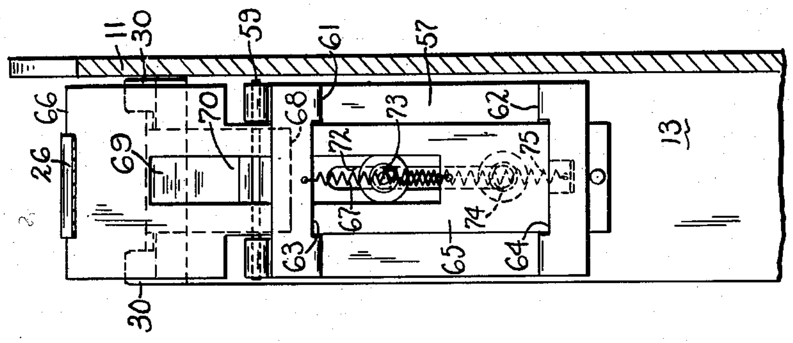
Fig. 10 is a sectional view on line 10—10 of Fig. 9.

In the operation of the device, the cover 16 is removed and a supply roll of tape placed upon the reel 22, the free end of the tape is drawn outwardly in the opening in the case below the guide roller 24, and the end placed upon the tape-end support 40 to which it will adhere. The parts are then in the position shown in Fig. 1 and it will be seen that the free end of the tape is held in an extended position so that the operator may grasp the tape rearwardly of the tape-end support 40 by inserting his finger in the recess 14. Thus the fingers of the operator do not come into contact with the extreme end of the tape. As shown in dotted lines in Fig. 1, the operator may lift the tape from the support 40 and draw the desired length from the roll. He then moves the tape downwardly toward the severing member. The tape again contacts the tape-end supporting surface 40 and moves the stripper member downwardly against the tension of the spring 37. This downward movement of the stripper member withdraws the guard 41 from its position above the edge of the blade, as shown in Figs. 4 and 5 as previously described. When the stripper member, by reason of the pressure of the tape thereon, reaches the position shown in Fig. 5, the tape engages the sharp edge of the severing blade and is severed thereagainst.

As soon as the severing action takes place, the stripper member is urged upwardly by the spring 37, thus stripping the tape from the severing blade if it tends to cling thereto, and also restoring the blade guard to its original position shown in Fig. 1. As the end of the tape clings to the support 40, the tape will be carried to the position shown in Fig. 1 in which it will be held in an extended position so that it may be readily grasped by the operator for a subsequent operation. As the movement of the stripper member, and, therefore, the tape-end support 40, is in an inclined direction, the length of the tape between the rear edge of the tape-end support and the point at which the tape leaves the supply roll will be no greater in the upper position of the tape-end support than in its lower position. There will, therefore, be no tendency of the stripper to bind in its upward movement as might be the case if it were required to draw a small additional length of tape from the supply roll.

Figure 7:
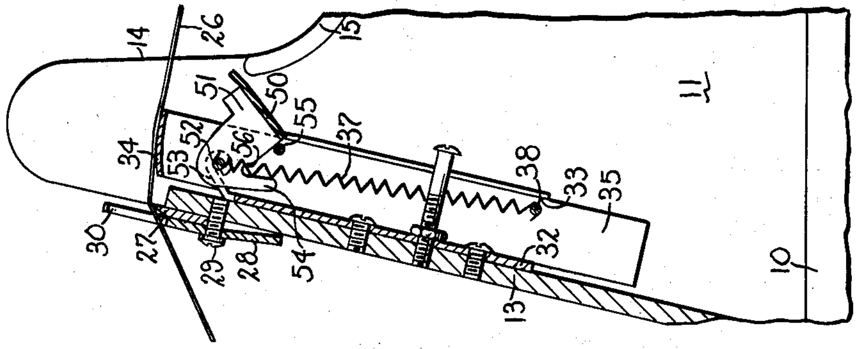
Fig. 7 is a sectional view of the modification shown in Fig. 6 with the parts in position occupied during the severing operation.
Figure 6:
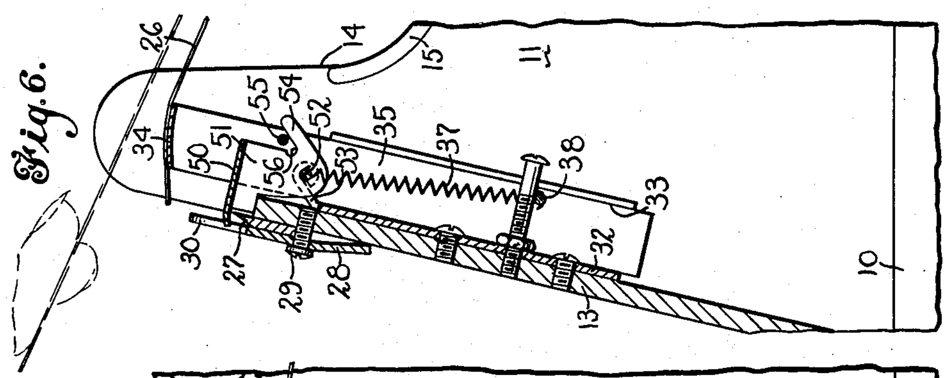
Fig. 6 is a sectional view similar to Fig. 4 showing a modified form of my invention.
Figure 8:
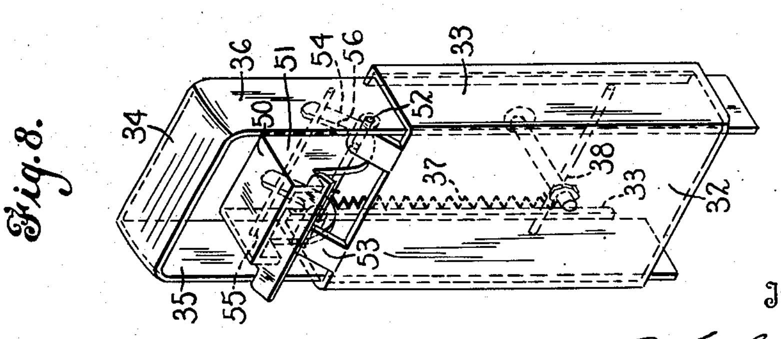
Fig. 8 is a perspective view of the stripper and guard mechanism shown in Figs. 6 and 7.

In Figs. 6 to 8 of the drawings, I have shown a modification of my invention which differs principally from that previously described in the construction of the guard member and its connection with the stripper. The guide member 32 is of substantially the same form as the guide member previously described as is also the stripper member, comprising the web portion 34 and the legs 35 and 36. The additional supporting surface 40 has been omitted in this form of my invention so that the tape clings to the upper surface of the web 34.

The guard member 50, which stands over the blade 27, is provided at each edge with a depending flange 51, which flanges are pivoted upon a pin 52 secured to spaced ears 53 upon the member 32. The flanges 51 are provided with rearwardly extending projections 54 designed to be engaged by a pin 55 extending between the legs 35 and 36 of the stripper. The projecting portions 54 extend in spaced relation to the flanges 51 so as to leave a recess 56 therebetween.

Normally the parts stand in the position shown in Fig. 6 with the tape engaged with the upper surface of the stripper member 34. When a sufficient length of tape has been drawn from the machine and the tape moved downwardly so that it may be severed against the blade 27, the pin 55 enters the recess 56 and by engaging the projection 54 rocks the guard member about the pivot pin 52. When the guard member is rocked rearwardly through a sufficient distance, it becomes over-balanced and drops under the influence of gravity to the position shown in Fig. 7, so that the stripper member may move downwardly to a sufficient extent to permit the tape to contact the blade. Upon the upward movement of the stripper member under the influence of the spring 37, after the severing operation has taken place, the pin 55 engages the rear edges of the flanges 51 and restores the stripper member to the position shown in Fig. 6. At the end of this movement, the projecting members 54 strike the pin 55 and prevent the guard from striking the sharp edge of the severing member.

In Figs. 9 to 12 of the drawings, I have shown a further modification of the severing and stripping devices. A guide member 57 is slidably mounted at the rear face of the flange 13 and a guard member 58 is pivoted at 59 to the upper end of this guide member. A stop 60 is secured to the guard 58, the stop being adapted to engage the upper edge of the flange 13 to limit the forward movement of the guard about the pivot 59.

Extending rearwardly from the guide member 57 are flanges 61 and 62 provided with guide slots 63 and 64, through which extends the body portion 65 of the stripper, this portion carrying a tape-end support 66 at its upper end. A spring 67, secured to the member 65 at the lower end of the spring and to the member 61 at the upper end of the spring, urges the stripper in an upward direction.

Figure 9:
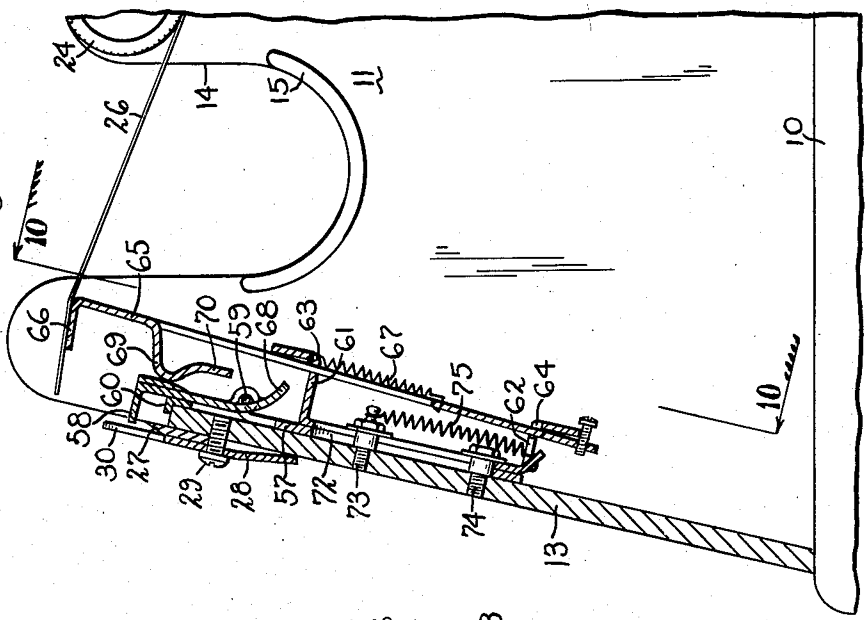
Fig. 9 is a sectional view similar to Fig. 4 showing a further modification.

The body of the guard member 58 is provided with a rearwardly extending tail portion 68, and the body 65 of the stripper member is provided with a forwardly projecting cam portion 69 having a downwardly extending end 70. As shown in Fig. 9, when the stripper member is at its upper position, the cam portion 69 engages the rear face of the guard member 58 and holds it in its operative position. When, however, the stripper member is moved downwardly, the cam end portion 70 engages the tail 68 of the guard member and swings the latter rearwardly about its pivot 59, as shown in Fig. 11.

Figure 11:
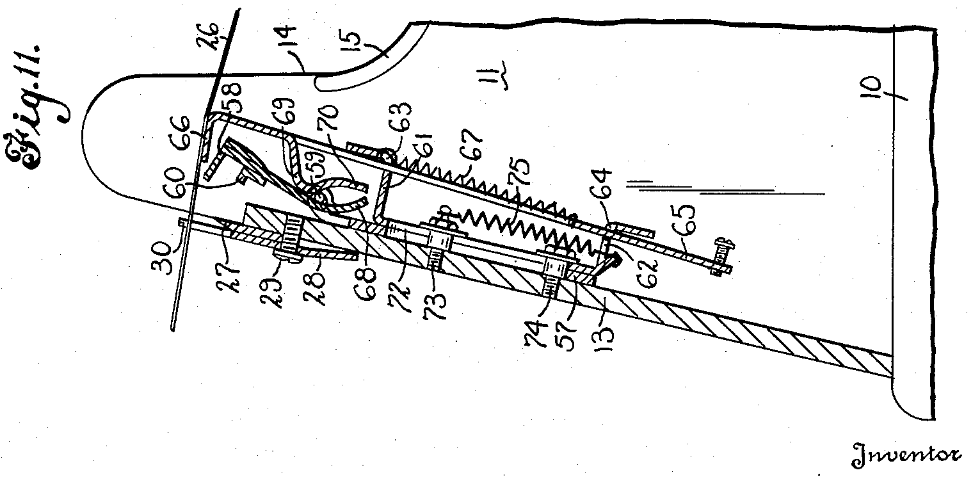

It will be seen that with the parts in the position shown in Fig. 11, the guard member has been moved to a position to expose the severing blade, but the stripper member has not been moved downwardly to a sufficient extent to permit the tape to engage the blade. For this reason the guide member 57, to which the stripper member is pivoted, is slidably mounted upon the flange 13 so that this guide member and associated parts may move downwardly with the continued movement of the stripper. To this end the guide member is provided with an elongated slot 72 through which extend screws 73 and 74 secured in the flange 13, so that this guide member may slide downwardly upon the flange from the position shown in Fig. 11 to the position shown in Fig. 12. A spring 75, secured at its upper end to the screw 73 and secured at its lower end to the guide member 57, normally urges the guide member to its upper position.

When the operator has drawn a length of tape from the supply roll and moves the tape downwardly toward the severing blade, the depending cam end 70 upon the stripper engages the tail portion 68 of the guard and moves the latter to the position shown in Fig. 11. At this time the lower portion of the cam projection 69 strikes the pivot pin 59 and continued downward movement of the stripper also effects downward movement of the guide member 57 and the guard pivoted thereto, so that all of the parts move from the position shown in Fig. 11 to that shown in Fig. 12. When the tape has been severed, the spring 75 returns the guide member 57 to its upper position, while the spring 67 returns the stripper to its uppermost position shown in Fig. 9.

Figure 13:
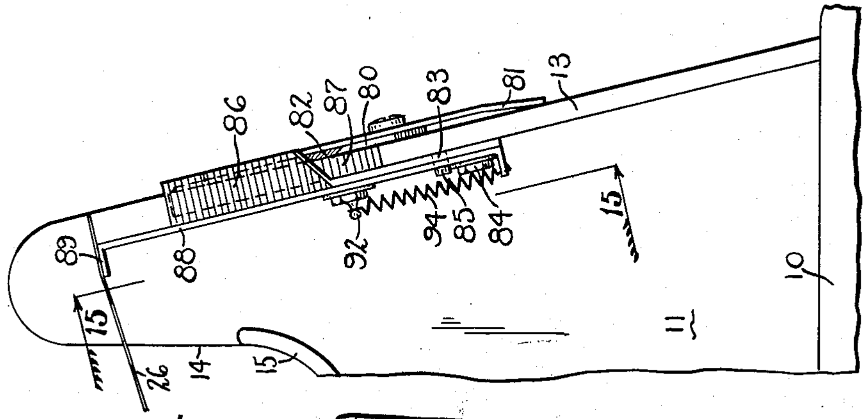
Fig. 13 is a side elevational view of a further modification of my invention.
Figure 12:
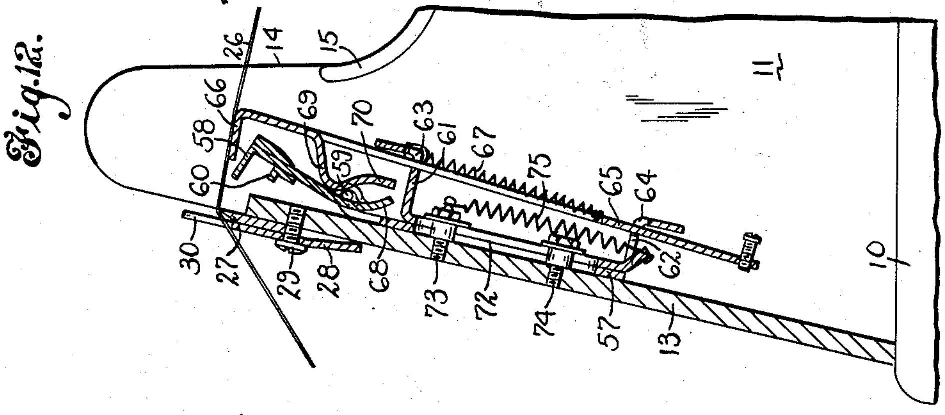
Figs. 11 and 12 are views similar to Fig. 9 but showing the parts in different positions.
Figure 14:
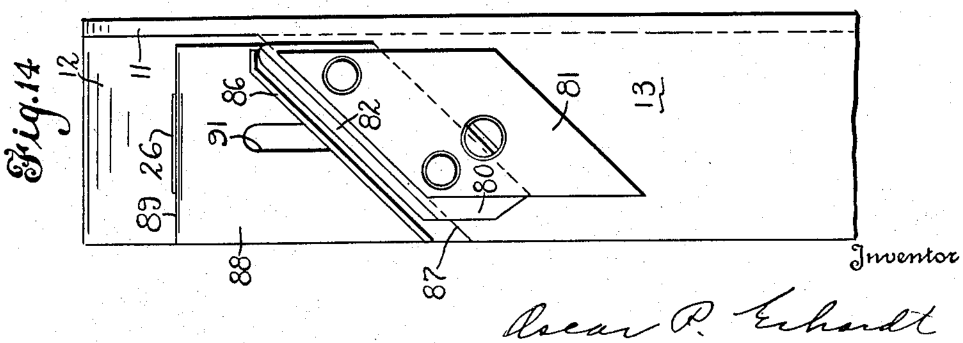
Fig. 14 is a front view of the device shown in Fig. 13.

In Figs. 13 to 16 of the drawings, I have shown a further modification in which a severing blade 80 is secured to the forward face of the flange 13 by a clamping plate 81. As shown in Fig. 14 the severing edge 82 of the blade stands in an inclined position with respect to the flange 13. A guard member 83 is pivoted to the rear face of the flange 13 at 84, this guard being provided with a rearwardly projecting pin 85 and a guard flange 86 which extends forwardly over the inclined edge 87 of the flange 13 so that the flange 86 stands over the edge 82 of the severing blade and extends in a direction substantially parallel with the edge of the blade.

A stripper member 88, provided with an upper tape-supporting surface 89, is slidably mounted at the rear of the flange 13, the guard member 83 lying between this member and the flange. The member 88 is provided with a guide slot 90 slidably receiving the pivot pin 84 of the guard member 83, and is also provided with a guide slot 91 slidably receiving a pin 92 secured to the flange 13, this latter pin also being received in an arcuate slot 93 provided in the guard member. A spring 94 normally urges the stripper member 88 upwardly.

The stripper member 88 is also provided with an L-shaped slot 95 which receives the pin 85 upon the blade guard 83.

Figure 16:
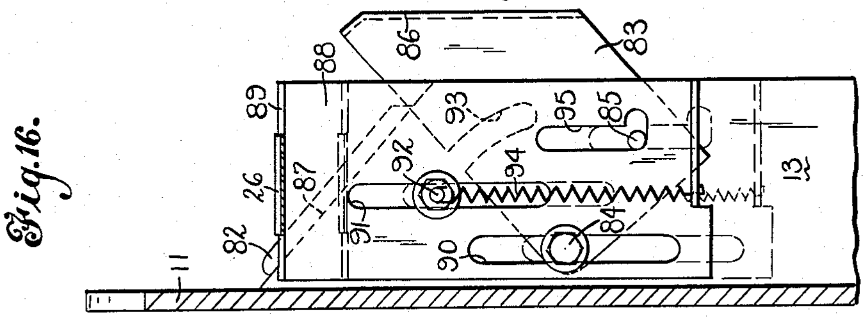
Fig. 16 is a view similar to Fig. 15 but showing the parts in another position.

As shown in Fig. 16, the blade guard 83 swings laterally from a position over the edge 82 of the severing blade to a position in which the guard flange 86 extends substantially vertically and exposes the edge of the blade, the swinging motion of the guard taking place about its pivotal connection 84 with the flange 13. This movement is effected by the engagement of the horizontal portion of the L-shaped slot 95 in the stripper 88 with the pin 85 on the guard member, as will now be described.

Figure 15:
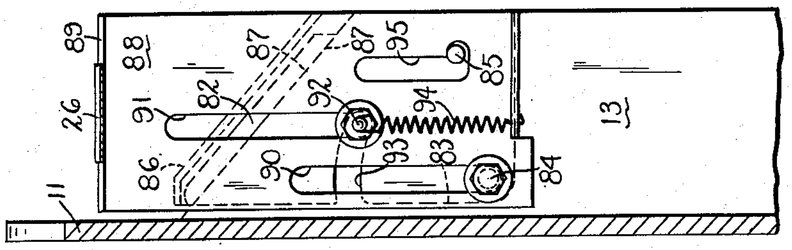
Fig. 15 is a sectional view on line 15—15 of Fig. 13.

Normally the parts are in the position shown in Figs. 13, 14 and 15. When the operator has drawn a sufficient length of tape from the supply roll and moves the tape downwardly toward the severing blade, pressure of the tape upon the tape-end supporting surface 89 will cause the stripper 88 to move downwardly, the initial movement being from the position shown in Fig. 15 to that shown in full lines in Fig. 16. During this part of the movement, the upper edge of the horizontal portion of the L-shaped slot 95 will bear against the pin 85 and swing the guard plate 83 to the position shown in Fig. 16. At this time the pin 85 has moved inwardly so as to register with the vertical portion of the slot 95. Upon further downward movement of the stripper member 88, the latter moves downwardly independently of any movement of the guard 83, as shown in dotted lines in Fig. 16, this relative movement being permitted by the pin 85 engaging the vertical portion of the slot 95.

After the tape has been severed, a reverse movement of the parts will take place. That is, the stripper 88 will move from the dotted-line position shown in Fig. 16 to the full-line position shown in this figure, at which time the member 88 will move upwardly relatively to the pin 85 until the latter reaches the bottom of the vertical slot. When the pin is engaged by the lower edge of the slot 95, it will be moved upwardly and the horizontal portion of this slot will also permit it to move outwardly as will be required by reason of the guard 83 being pivoted at the point 84. During the continued upward movement of the stripper, the guard will be moved from its position shown in Fig. 16 to that shown in Fig. 15 in which it stands over the edge of the blade.

Figures 17, 18:
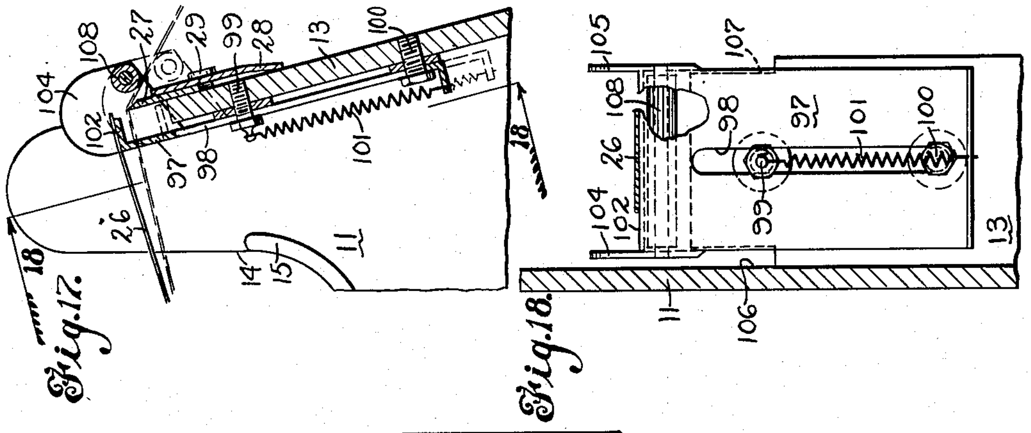
Fig. 17 is a fragmentary sectional view of a further modification of the severing and guard mechanism.
Fig. 18 is a sectional view on line 18—18 of Fig. 17.

In Figs. 17 and 18 of the drawings, I have shown a further modification of my invention in which a stripper member 97 is slidably mounted at the rear face of the flange 13, the stripper member being provided with a slot 98 which receives screws 99 and 100 secured in the flange. A spring 101, secured to the screw 99 at its upper end and to the end of the stripper 97 at its lower end, urges the stripper upwardly. The latter is provided with a tape-end supporting surface 102 at its upper end.

Projecting forwardly from the side edges of the stripper at its upper end are ears 104 and 105 which extend through cut out portions 106 and 107 of the flange 13. Rotatably carried by the ears 104 and 105 is a guard roller 108 which stands forwardly of the severing blade 27, while the tape-end supporting surface 102 is rearwardly of this blade, as shown in Fig. 17.

When the operator moves the tape towards the severing blade, the stripper 97 is moved downwardly, thus moving the guard roller 108 downwardly from the full-line position shown in Fig. 17 to the dotted-line position shown in this figure, thus enabling the tape to be engaged with the cutting edge of the blade 27 to be severed thereby. After the severing operation, the spring 101 moves the stripper and guard roller upwardly to the full-line position shown in Fig. 17 in which the blade edge is again protected by the guard roller 108 and the free end of the tape is held in extended position by its adherence upon the tape-end supporting surface 102.

While I have shown and described some preferred embodiments of my invention, it will be understood that it is not to be limited to all of the details shown, but is capable of modification and variation within the spirit of the invention and within the scope of the claims.

What I claim is:

1. In a device for dispensing pressure-sensitive tape, a frame, means thereon for rotatably supporting a supply roll of tape, a severing blade fixedly supported on the frame in a position spaced from the supply roll, a tape-end support having an upwardly facing supporting surface to engage the tacky side of the tape, means mounting the tape-end support on the frame adjacent the blade for movement in a direction transverse to the path of the tape between the supply roll and blade, a blade guard hingedly connected to the frame and normally overlying said blade to guard the same, and means connecting said guard to said tape-end support mounting member for movement thereby to an inoperative position.

2. In a device for dispensing pressure-sensitive tape, a frame, means thereon for rotatably supporting a supply roll of tape, a severing blade supported in fixed position on the frame in a position spaced from the supply roll, a tape-end support having an upwardly facing supporting surface to engage the tacky side of the tape, means mounting the tape-end support on the frame adjacent the blade for movement in a direction transverse to the path of the tape between the supply roll and blade, and a blade guard hingedly connected to the frame and normally overlying said blade to guard the same, and means connecting said guard to said tape-end support mounting member for movement thereby to an inoperative position, said tape-end support being moved by pressure of the tape thereon when the latter is drawn toward the blade.

3. In a device for dispensing pressure-sensitive tape, a frame, means thereon for rotatably supporting a supply roll of tape, a severing blade fixedly supported on the frame in a substantially upright position and in a position spaced from the supply roll, a tape-end support having an upwardly facing supporting surface to engage the tacky side of the tape, means mounting the tape-end support on the frame adjacent the blade for movement in a direction substantially parallel to the blade and transverse to the path of the tape between the supply roll and blade, a blade guard hingedly connected to the frame and normally overlying said blade to guard the same, means connecting said guard to said tape-end support mounting member for movement thereby to operative and inoperative position, said tape-end support being connected to the frame below the path of the tape, and a spring urging said support upwardly across said path.

4. In a device for dispensing pressure-sensitive tape, a frame, means thereon for rotatably supporting a supply roll of tape, a severing blade supported in fixed position on the frame in a position spaced from the supply roll, a tape-end support having an upwardly directed tape-engaging surface, means mounting the tape-end support on the frame adjacent the blade for movement in a direction transverse to the path of the tape between the supply roll and blade, a blade guard hingedly connected to the frame for movement to a guarding position in which it overhangs the blade and to an inoperative position, and means connecting said guard to the tape-end support mounting means for movement thereby to both of said positions.

5. In a device for dispensing pressure-sensitive tape, a frame, means thereon for rotatably supporting a supply roll of tape, a severing blade supported on the frame in a position spaced from the supply roll, a tape-end support, means mounting the tape-end support on the frame adjacent the blade for movement in a direction transverse to the path of the tape between the supply roll and blade, a blade guard engaged with said mounting means to be moved thereby, and a link pivoted to the frame and to said guard.

6. In a device for dispensing pressure-sensitive tape, a frame, means thereon for rotatably supporting a supply roll of tape, a severing blade supported on the frame in a position spaced from the supply roll, a tape-end support, means mounting the tape-end support on the frame adjacent the blade for movement in a direction transverse to the path of the tape between the supply roll and blade, a blade guard, a link pivoted to the frame and to said guard, and interengaging means between said guard and mounting means whereby movement of the mounting means effects movement of the guard away from the blade.

7. In a device for dispensing pressure-sensitive tape, a frame, means thereon for rotatably supporting a supply roll of tape, a severing blade supported on the frame in a position spaced from the supply roll, a tape-end support, means mounting the tape-end support on the frame adjacent the blade for movement in a direction transverse to the path of the tape between the supply roll and blade, a blade guard pivoted to said mounting means, and a link pivoted to the frame and to said guard.

8. A device for dispensing pressure-sensitive tape as set forth in claim 1 wherein the blade guard is pivoted on the frame and provided with a projecting member, and the means connecting said guard to the mounting member comprises means on the mounting member to engage said projecting member.

9. A device for dispensing pressure-sensitive tape as set forth in claim 1 wherein the blade guard is pivoted to the frame and provided with a projecting member, and said mounting member carries means to engage said projecting member and provide a lost-motion connection between the projecting member and the mounting means.

10. A device for dispensing pressure-sensitive tape as set forth in claim 1 wherein the hinged connection of the blade guard with the frame comprises a plate slidably mounted on the frame to which the blade guard is pivoted, and wherein the mounting means is provided with a member to first engage and swing said guard about its pivot and thereafter move said plate.

11. In a device for dispensing pressure-sensitive tape, a frame, means thereon for rotatably supporting a supply roll of tape, a severing blade fixedly supported on the frame in a substantially upright position at a point spaced from the supply roll, a tape-end support, means mounting said tape-end support on the frame adjacent the blade for sliding movement in a direction substantially parallel to the blade and transverse to the path of the tape between the supply roll and blade, a blade guard, means pivotally connecting said guard to the frame for movement to an operative position overlying the blade and to an inoperative position in which the blade is exposed, and interengaging means between said mounting means and said guard whereby the latter is moved to both of its positions by movement of the mounting means.

12. A device for dispensing pressure-sensitive tape according to claim 11 wherein the blade guard is pivoted to the mounting means of the tape-end support for movement by the latter.

OSCAR P. ERHARDT.

References Cited in the file of this patent

UNITED STATES PATENTS

| Number | Name | Date |
|---|---|---|
| 744,637 | Sonnecken | Nov. 17, 1903 |
| 833,470 | Lipowsky | Oct. 16, 1906 |
| 1,979,227 | Kierspe | Oct. 30, 1934 |
| 2,290,223 | Black et al. | July 21, 1942 |
| 2,484,673 | Becker | Oct. 11, 1949 |
| 2,555,187 | Erhardt | May 29, 1951 |